Patented Mar. 29, 1932

1,851,469

UNITED STATES PATENT OFFICE

JOSEPH M. VERDEROSA, OF PARLIN, NEW JERSEY, ASSIGNOR TO E. I. DU PONT DE NEMOURS & COMPANY, OF WILMINGTON, DELAWARE, A CORPORATION OF DELAWARE

GRAINING INK

No Drawing.   Application filed July 9, 1928. Serial No. 291,491.

This invention relates to the production of grained effects on metal or wood and more particularly to an improved ink for the production of such effects.

Heretofore, two distinct types of material have been used for the production of grained effects on metal or inferior wood to imitate expensive and beautiful wood. First, a pigment dispersed in an oleo-resinous vehicle which was used to produce the design of the wood grain upon a ground coat of a different shade; and second, pigment dispersed in water containing a small amount of a water soluble adhesive used over a ground in the same manner. With the advent of pyroxylin base finishes, attempts have been made to use a pyroxylin enamel as a base or ground coat, to then produce the designs with either the oleo-resinous or the aqueous type of graining ink and finally to apply a clear pyroxylin lacquer as a finish. The effects so produced have been satisfactory so far as appearance is concerned, but difficulties have been encountered in the application. For example, in using the oleo-resinous type of graining ink, it is necessary to use a large proportion of drying oil in order to obtain a satisfactory flow and a sufficiently prolonged period of time before setting up is required to permit the designs to be produced. The slow oxidation of the oil, or in other words, the long drying period required slows up the work; and even when dry, the oleo-resinous graining ink is readily attacked by a top coat of clear pyroxylin lacquer. The lacquer causes a lifting of the ink and produces unsightly wrinkles in the finish. When the aqueous type of graining ink is used, such as the frequently recommended dispersion of pigment in stale beer, the effect of a top coat of lacquer is quite satisfactory and the drying time is very short, but the period of time from application to setting up is entirely too short to permit producing of the desired designs.

This invention has as an object the providing of a graining ink which will not require a long period of time for oxidation, but which will not on the other hand dry too quickly to permit the producing of desired designs. A further object is to provide such a graining ink which can be satisfactorily used on a pyroxylin enamel base and covered with a pyroxylin lacquer top coat. A still further object is to provide such a graining ink which can be diluted with water to produce lighter colors. Other objects will appear hereinafter.

These objects are accomplished by the following invention of a composition comprising a dispersion of pigment in ethylene glycol and water with a small amount of a gum soluble in both ethylene glycol and water.

I have found that a pigment so dispersed in ethylene glycol and water with a small amount of a gum soluble in both ethylene glycol and water will produce a graining ink which will give satisfactory results, and the following is an example of such a composition made in accordance with my invention:—

| | |
|---|---:|
| Pigment | 30.0 |
| Gum arabic | 2.5 |
| Water | 7.5 |
| Ethylene glycol | 60.0 |
| | 100.0 |

In place of gum arabic, I may substitute any gum which is soluble in both water and ethylene glycol.

My improved compositions are valuble as graining inks as herein described because they do not contain oils requiring a prolonged period of oxidation, or derivatives of oils which tend to slower drying and are otherwise unsuitable for the attainment of the objects of the invention. My improved compositions are, on the other hand, characterized by a sufficiently long period of time between application and setting up to permit the carrying out of all necessary work, even where the designs are produced on large panels. The ethylene glycol, being completely volatile, offers no difficulty when a top coat of pyroxylin lacquer is applied to the grained surface. The surface tension characteristics of the composition herein described are such that effects can be obtained which would not be possible with the oleo-resinous graining inks and my compositions have the additional advantage that they may be diluted with water if lighter colors are desired.

This air drying graining ink may be used equally well for hand graining or machine graining.

As many apparently widely different embodiments of this invention may be made without departing from the spirit and scope thereof, it is to be understood that I do not limit myself to the specific embodiments thereof except as defined in the appended claims.

I claim:

1. A quick drying graining composition capable of receiving a graining design over a commercially workable area before drying, which comprises a pigment dispersed in a vehicle comprising a solution consisting of 30 parts by weight of pigment, 2.5 parts of gum arabic, 7.5 parts of water and 60 parts of ethylene glycol.

2. A quick drying graining composition capable of receiving a graining design over a commercially workable area before drying, which comprises a pigment dispersed in a vehicle comprising a solution consisting of 30 parts by weight of pigment, 2.5 parts by weight of a gum soluble in water and ethylene glycol, 7.5 parts of water and 60 parts of ethylene glycol.

In testimony whereof, I affix my signature.

JOSEPH M. VERDEROSA.